BLOCKING OSCILLATOR EMPLOYING TWO SWITCH MEANS FOR SETTING AND AUTOMATICALLY RESETTING MAGNETIC CORE TRANSFORMER

Filed Nov. 4, 1963

INVENTOR.
EDWIN H. SCHMIDT

BY Omund R Dahle

ATTORNEY 3,229,121
Patented Jan. 11, 1966

3,229,121

BLOCKING OSCILLATOR EMPLOYING TWO SWITCH MEANS FOR SETTING AND AUTOMATICALLY RESETTING MAGNETIC CORE TRANSFORMER

Edwin H. Schmidt, Minnetonka Village, Minn., assignor to Honeywell Inc., a corporation of Delaware Filed Nov. 4, 1963, Ser. No. 321,009
10 Claims. (Cl. 307—88.5)

This invention is concerned with magnetic pulse forming circuits, and more particularly with improved magnetic blocking oscillator apparatus, which includes semiconductor devices and magnetic core devices for the improvement of power efficiency in blocking oscillators utilizing bistable magnetic cores.

Use of a high flux retentivity magnetic core, having two flux saturable states, in blocking oscillators is fast becoming well known in the electronic art. The use of set and reset channels containing windings on the core is also known in the art. Generally, such circuits utilize a pulse input to start a current flow through the set channel winding to drive the core into saturation. The current in the set channel continues so long as the input is present, despite the fact that the core reaches saturation. This naturally results in an unnecessary consumption of power. This invention is novel in the ability of both the set and reset channels to turn themselves off immediately after driving the magnetic core to the respectively proper state of saturation, whether or not the input signal is still present.

It is therefore an object of this invention to provide improved low power blocking oscillators.

A further object of this invention is to provide blocking oscillators having set and reset channels with means for improving power efficiency.

A still further object of this invention is to provide low power blocking oscillators with a variable width output signal in phase with or delayed from an input signal.

These and other objects of the invention will become apparent upon consideration of the accompanying claims, specification and drawings, of which:

Similar numerals are used in the figures to designate components having similar functions in the various circuits.

Figures 1, 2:
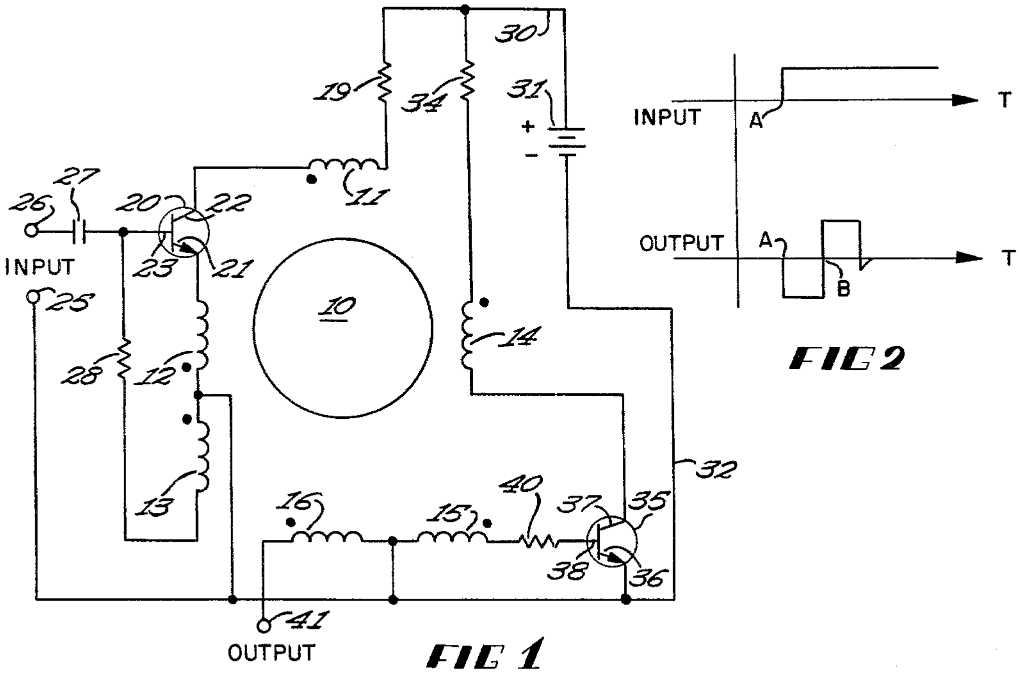
FIGURE 1 is a schematic diagram of an embodiment of the invention.
FIGURE 2 is a graph comparing the time relationship of the input and output signals of FIGURE 1.

Referring now to FIGURE 1, there is disclosed a saturable magnetic core 10. Wound on core 10 are windings 11, 12, 13, 14, 15 and 16. There is also disclosed a pair of semiconductor switching devices, here shown as a pair of NPN transistors 20 and 35. Transistor 20 has an emitter 21, a collector 22 and a base 23, transistor 35 has an emitter 36, a collector 37 and a base 38. A positive bus lead 30 is connected to the positive terminal of a source of energy, here shown as a battery 31. A resistor 19 has one end connected to positive bus lead 30 and its other end connected to winding 11. The other end of winding 11 is connected to collector 22. Winding 12 has one end connected to emitter 21, the other end of winding 12 is connected to a negative bus lead 32 connected to the negative terminal of battery 31. Winding 13 has one end connected to negative bus lead 32, the other end of winding 13 is connected to one end of a resistor 28, and the other end of resistor 28 is connected to base 23. An input terminal 26 is connected to one end of a capacitor 27, the other end of capacitor 27 is connected to base 23. An input terminal 25 is connected to negative bus lead 32. A resistor 34 has one end connected to positive bus lead 30, the other end of resistor 34 is connected to one end of winding 14, and the other end of winding 14 is connected to collector 37. Emitter 36 is connected to negative bus lead 32. Base 38 is connected to one end of resistor 40, the other end of resistor 40 is connected to one end of winding 15, and the other end of winding 15 is connected to negative bus lead 32. Winding 16 has one end connected to negative bus lead 32, the other end of winding 16 is connected to an output terminal 41.

Referring now to FIGURE 2 there is shown a graphical representation of the relation in time of the input signal relative to the output signal. Point A is the point in time where the input signal is applied, while Point B is the point in time where the positive output pulse commences.

Figures 3, 4:
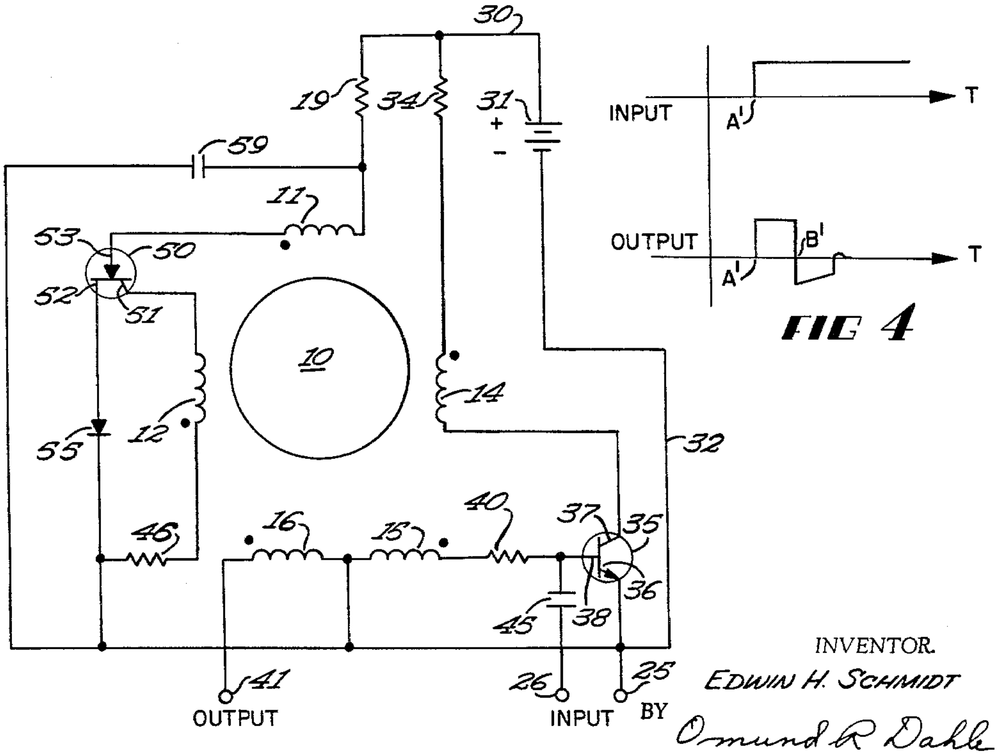
FIGURE 3 is a schematic diagram of another embodiment of the invention.
FIGURE 4 is a graph comparing the time relationship of the input and output signals of FIGURE 3.

Referring now to FIGURE 3, there is disclosed a saturable magnetic core 10. Wound on core 10 are windings 11, 12, 14, 15 and 16. There is also disclosed a pair of semiconductor switching devices, here shown as a transistor 35 and a controlled rectifier 50. Transistor 35 has an emitter 36, a collector 37 and a base 38. Controlled rectifier 50 has a cathode 52, an anode 53, and a gate 51. A positive bus lead 30 is connected to the positive terminal of a source of energy, here shown as a battery 31. A resistor 19 has one end connected to positive bus lead 30, the other end of resistor 19 is connected to one end of winding 11 and to one end of a capacitor 59. The other end of capacitor 59 is connected to a negative bus lead 32 which is connected to the negative terminal of battery 31. The other end of winding 11 is connected to anode 53. Cathode 52 is connected to one end of a diode 55, and the other end of diode 55 is connected to negative bus lead 32. Gate 51 is connected to one end of winding 12, the other end of winding 12 is connected to one end of a resistor 46, and the other end of resistor 46 is connected to negative bus lead 32. One end of a resistor 34 is connected to positive bus lead 30, the other end of resistor 34 is connected to one end of winding 14, and the other end of winding 14 is connected to collector 37. Emitter 36 is connected to the negative bus lead 32. Base 38 is connected to one end of a resistor 40 and to one end of a capacitor 45. The other end of capacitor 45 is connected to an input terminal 26. The other end of resistor 40 is connected to one end of winding 15, and the other end of winding 15 is connected to negative bus lead 32. An input terminal 25 is connected to negative bus lead 32. One end of winding 16 is connected to negative bus lead 32, and the other end of winding 16 is connected to an output terminal 41.

FIGURE 4 is a graphical representation of the relation in time between the input and output signals of FIGURE 3. Point A' is the point in time where the input signal is applied and where the positive output signal begins. Point B' is the point in time where the positive output signal ceases.

OPERATION OF FIGURE 1

The magnetic core 10 of FIGURE 1 is of a material having a high flux retentivity and a flux-current characteristic which forms a substantially rectangular hysteresis loop. To operate such a core as a blocking oscillator it is desired to drive the core from a first or reference flux saturated state at one polarity of the hysteresis loop to a second flux saturated state at a second polarity of the hysteresis loop. This may be accomplished by the use of a set channel and a reset channel which include windings wound on the core. The set channel may be turned on by an input signal, and held on while sufficient coercive current passes through a set winding to drive the core from the first to the second saturation state. The reset channel may sense the arrival of the core at the second saturation state, and turn on to allow coercive current to pass through a reset winding to drive the core back to the first saturation state. The transition from state to state may be sensed by an output winding.

It is apparent that the driving or coercive currents need only be present until the core has reached the respective state of saturation. Prior art circuits often have set channels, and sometimes reset channels, turned on and off by the input signals. Thus, in such prior art circuits, if the input pulse width is greater than the time needed to saturate, a coercive current may continue to flow in a channel despite the fact that the core has already reached saturation. If this occurs, the coercive current will increase sharply due to the drop of impedance of the windings on the saturated core, thus a large amount of power may be wasted. This excess current flow is removed in this invention to provide a blocking oscillator with high power efficiency.

In the circuit of FIGURE 1, the set channel is formed by windings 11, 12 and 13, resistor 19, and transistor 20. Assuming an input step function, as shown in FIGURE 2, arrives at input terminal 26 at a time A, the input signal will be differentiated by capacitor 27 and resistor 28. The resulting positive voltage spike will be felt on base 23, making base 23 more positive than emitter 21 and thus turning on NPN transistor 20. A current will then flow from the positive terminal of battery 31, through lead 30, resistor 19, set winding 11, from collector 22 to emitter 21 of transistor 20, through winding 12, and through lead 32 to the negative terminal of battery 31. The current through winding 11 is defined as drive or coercive current as it is this current which changes the flux state of core 10 and drives it from the first to the second state of saturation. When core 10 is driven out of the first state of saturation, and before the second state is reached, winding 11 will have a high impedance. The voltage developed across winding 11 will be negative at the dotted end and positive at the other end. This voltage, through the coupling of core 10, will be induced on winding 13, also making winding 13 negative at the dotted end and positive at the other end. It is apparent that the induced voltage on winding 13 will be of a polarity to keep transistor 20 on, thus keeping the coercive current flowing. When the core 10 reaches the second state of saturation, the impedance of winding 11 will drop sharply, the induced voltage on winding 13 will thus be removed, and transistor 20 will be turned off thus stopping the coercive current. This turn off action will take place when core 10 reaches the second state of saturation whether or not the input signal is still present.

In the circuit of FIGURE 1, the reset channel is formed by windings 14 and 15, resistors 34 and 40, and transistor 35. When the set channel turns off, as described above, the collapsing magnetic field around winding 11 will cause an induced voltage on winding 15 of a polarity to turn on transistor 35. A current will then flow from the positive terminal of battery 31, through lead 30, resistor 34, reset winding 14, from collector 37 to emitter 36 of transistor 35, and through lead 32 to the negative terminal of battery 31. The coercive current through winding 14 will drive the core 10 back to its first state of saturation. During the transition of core 10 from the second to the first state of saturation the induced voltage on winding 15 from winding 14 will keep transistor 35 on, in the same manner that the induced voltage on winding 13 from winding 11 kept transistor 20 on, as described above. When the flux in core 10 reaches the first state of staturation, the impedance of winding 14 will drop, the induced voltage on winding 15 will be removed, and transistor 35 will turn off the reset channel. When the coercive current in the reset channel. When the coercive current in the reset channel is turned off, the collapsing magnetic field around winding 14 will induce a voltage on windings 12 and 13. The polarities of these voltages are such that the induced voltage on winding 13 will attempt to turn on transistor 20, but will not be able to do so because of the bucking induced voltage on winding 12. Note that when the set channel and the reset channel have turned themselves off, there is no direct current path left in the circuit, and therefore no further power is consumed. The circuit lies dormant, with the high flux retentivity core 10 holding in the first or reference state of saturation, until the next input signal is applied.

The output is formed across output winding 16 which is coupled by core 10 to set winding 11 and reset winding 14. The output pulse width of the positive and negative portions can be changed, respectively, by varying the value of resistors 34 and 19. Referring to FIGURE 2, it is apparent that as current starts to flow in the set channel at a time A, a negative voltage appears at output terminal 41. When core 10 reaches saturation, at a time B, current starts to flow in the reset channel and the output voltage switches to positive until core 10 again saturates, in the opposite direction, when the output drops to zero voltage.

OPERATION OF FIGURE 3

The magnetic core 10 of FIGURE 3 is the same as the core described above for FIGURE 1. The set channel of FIGURE 3 is formed by windings 14 and 15, resistor 34 and transistor 35. Assuming an input step function, as shown in FIGURE 4, arrives at input terminal 26 at a time A′, the input signal will be differentiated by capacitor 45 and resistor 40. The resulting positive voltage spike will be felt on base 38, making base 38 more positive than emitter 36 and thus turning on NPN transistor 35. A current will then flow from the positive terminal of battery 31, through lead 30, resistor 34, set winding 14, from collector 37 to emitter 36 of transistor 35, and through lead 32 back to the negative terminal of battery 31. The current through winding 14 is the coercive current. The regenerative coupling between windings 14 and 15 will cause an induced voltage on winding 15 of a polarity to keep transistor 35 on until the core 10 reaches saturation. When core 10 saturates the inductive coupling between windings 14 and 15 is effectively removed, the induced voltage on winding 15 is thus substantially removed, and transistor 35 turns off, thus turning off the set channel.

The reset channel of FIGURE 3 is formed by windings 11 and 12, resistor 19, capacitor 59, and controlled rectifier (SCR) 50. In the dormant state, capacitor 59 will be charged to a voltage equal to that of battery 31, the charge path being from the positive terminal of battery 31, through lead 30, resistor 19, capacitor 59, and back through lead 32 to the negative terminal of battery 31. When the set channel turns off, as described above, the collapsing magnetic field around winding 14 will induce a voltage on winding 12 of a polarity to activate gate 51 and thus turn on SCR 50. A holding current will begin to flow from one end of capacitor 59, through reset winding 11, from anode 53 to cathode 52 of SCR 50, through diode 55, and back to the other end of capacitor 59. This current through winding 11 will be the reset coercive current. The values of resistor 19 and capacitor 59 are chosen such that as core 10 reaches the reset state of saturation, capacitor 59 will have discharged sufficiently to be unable to provide sufficient holding current for SCR 50. SCR 50 will thus turn off, capacitor 59 will recharge, and the circuit will lie dormant with no further power drain until another input signal is applied. Note that when core 10 saturates, the slow rate of change of current through winding 11, caused by the turn off of SCR 50, will result in very little induced voltage on winding 15, thus keeping transistor 35 off.

The output pulse is formed across winding 16 in the same manner as described in FIGURE 1, with the exception that the output signal is initially positive at time A′ and goes negative at a time B′, as shown in FIGURE 4. The duration of the positive output signal in the circuit may be varied by varying the value of resistor 34.

Although the operations of FIGURES 1 and 3 were described using a step function as the input signal, the blocking oscillators of this invention will operate on any input signal having a rise time fast enough to cause a positive spike on the bases of the input transistors. Should an input signal be provided, which is itself a positive spike, the input differentiating circuits could be removed, and the spike applied directly to the bases of the input transistors.

The circuits of FIGURES 1 and 3 have been built and found operative. One of many possible sets of values for each of FIGURES 1 and 3 is given in the tables below.

*Table for FIGURE 1*

| | |
|---|---|
| Transistors **20, 35** | 2N910. |
| Magnetic core **10** | 121D 500–30, |
| Winding **16** | 30 turns. |
| Windings **11, 14** | 25 turns. |
| Windings **13, 15** | 20 turns. |
| Windings **12** | 8 turns. |
| Resistor **34** | 40 ohms. |
| Resistor **19** | 47 ohms. |
| Resistors **28, 40** | 390 ohms. |
| Capacitor **27** | 0.006 microfarads. |

*Table for FIGURE 3*

| | |
|---|---|
| Transistor **35** | 2N910. |
| SCR **50** | 3F30. |
| Diode **55** | 1N645. |
| Magnetic core **10** | 121D 500–30. |
| Windings **11, 12** | 60 turs. |
| Winding **16** | 30 turns. |
| Winding **14** | 25 turns. |
| Winding **15** | 20 turns. |
| Resistor **34** | 40 ohms. |
| Resistor **40** | 430 ohms. |
| Resistor **46** | 470 ohms. |
| Resistor **19** | 920 ohms. |
| Capacitor **45** | 0.006 microfarads. |
| Capacitor **59** | 0.3 microfarads. |

The average power required to run the blocking oscillators is directly proportional to the frequency, $f$, of the input signal. For the blocking oscillator of FIGURE 1, the approximate relationship becomes:

$$P_{ave}=10^{-5}f \text{ watts}$$

For the blocking oscillator of FIGURE 3 the approximate relationship becomes:

$$P_{ave}=1.4\times10^{-5}f \text{ watts}$$

It will be obvious that the general principles herein disclosed may be embodied in many other embodiments widely different from those illustrated, without departing from the spirit of the invention as defined in the following claims.

I claim as my invention:

1. A blocking oscillator comprising: a magnetic core of high flux retentivity having two states of flux saturation at opposite polarities; a plurality of windings on said core; a source of energy; a set channel, including a number of said windings, connected across said source of energy; switching means in said set channel; said switching means connected to one of said number of windings to control the coercive current therethrough; a flux saturation sensing winding in said number of windings connected in controlling relation to said switching means, whereby an input signal will cause said switching means to turn on said set channel thus driving said core from one of said states of saturation to the other of said states of saturation, at which other state of saturation said switching means will turn off said set channel; a reset channel, including further of said windings, connected across said source of energy; second switching means in said reset channel; said second switching means connected to one of said further of said windings to control the coercive current therethrough; a second flux saturation sensing winding in said further of said windings connected in controlling relation to said second switching means, whereby when said core reaches said other state of saturation said second switching means will turn on said reset channel thus driving said core back to said one state of saturation, at which one state of saturation said second switching means will turn off said reset channel; and output means including still further of said windings, for providing an output signal as said core is driven between said two states of saturation.

2. A blocking oscillator comprising: a magnetic core of high flux retentivity having two stages of flux saturation at opposite polarities; a plurality of windings on said core; a source of energy; a set channel, including a number of said windings, connected across said source of energy; semiconductor switching means in said set channel having at least input, output and control electrodes; said input and output electrodes connected in circuit with one of said number of windings to control the coercive current therethrough, whereby an input pulse on said control electrode will cause said semiconductor switching means to turn on said set channel; means including a flux saturation sensing winding in said number of windings regeneratively coupling said control electrode to said input and output electrodes, whereby said set channel will remain turned on until said core is driven from one of said states of saturation to the other of said states of saturation, at which said other state of saturation said flux saturation sensing means will turn off said semiconductor switching means; a reset channel, including further of said windings, connected across said source of energy; second semiconductor switching means in said reset channel having at least input, output and control electrodes; said second input and output electrodes connected in circuit with one of said further of said windings to control the coercive current therethrough, means including a second flux saturation sensing winding in said further windings coupling said second semiconductor switching means control electrode to said core, whereby when said core reaches said other state of saturation said second semiconductor switching means will turn on said reset channel; means including said second flux saturation sensing winding regeneratively coupling said second semiconductor switching means control electrode to said second semiconductor switching means input and output electrodes, whereby said reset channel will remain turned on until said core is driven back to said one state of saturation, at which said one state of saturation said second flux saturation sensing winding will turn off said second semiconductor switching means; output means including still further of said windings, for providing an output signal as said core is driven between said two states of saturation.

3. In combination; a magnetic core of high flux retentivity having two states of flux saturation at opposite polarities; a plurality of windings on said core including first, second, third, fourth, fifth and sixth windings; a source of energy; first semiconductor switching means having input, output and control electrodes; said first winding connected intermediate one of said input and output electrodes of said first semiconductor switching means and a first polarity of said source of energy; said second winding connected intermediate the other of said input and output electrodes of said first semiconductor switching means and a second polarity of said source of energy; input means connected to said control electrode of said first semiconductor switching means; said third winding connected intermediate said control electrode of said first semiconductor switching means and said second polarity of said source of energy, and regeneratively coupled to said first winding whereby when a pulse from said input means turns on said first semiconductor switching means the current through said first winding will cause said core to pass from one of said states of saturation to the other of said states of saturation, and will also cause a regenerative induced voltage in said third winding to keep said first semiconductor switching means on until said other state of saturation is reached, at which other state of saturation the impedance of said first winding is substantially reduced, thus removing said regenerative voltage on said third winding and turning off said first semiconductor switching means; second semiconductor switching means having input, output and control electrodes; said fourth winding connected intermediate one of said input and output electrodes of said second semiconductor switching means and said first polarity of said source of energy; the other of said input and output electrodes of said second semiconductor switching means connected to said second polarity of said source of energy; said fifth winding connected intermediate said control electrode of said second semiconductor switching means and said second polarity of said source of energy, and inductively coupled to said fourth winding, such that when said core reaches said other state of saturation the collapsing magnetic field of said first winding will induce a voltage on said fifth winding of a polarity to turn on said second semiconductor switching means, thus causing a current flow through said fourth winding that will drive said core back to said one state of saturation, and also cause a regenerative induced voltage from said fourth winding on said fifth winding to keep said second semiconductor switching means on until said one state of saturation is reached, at which one state of saturation the impedance of said fourth winding is substantially reduced, thus removing said regenerative voltage on said fifth winding and turning off said second semiconductor switching means; and output means including said sixth winding for providing an output pulse each time said core is driven between said two states of saturation.

4. In combination; a magnetic core of high flux retentivity having two states of flux saturation at opposite polarities; a plurality of windings on said core including first, second, third, fourth and fifth windings; a source of energy; first semiconductor switching means having input, output and control electrodes; said first winding connected intermediate one of said input and output electrodes of said first semiconductor switching means and a first polarity of said source of energy, the other of said input and output electrodes of said first semiconductor switching means connected to a second polarity of said source of energy; input means connected to said control electrode of said first semiconductor switching means; said second winding connected intermediate said control electrode of said first semiconductor switching means and said second polarity of said source of energy, and regeneratively coupled to said first winding whereby when a pulse from said input means turns on said first semiconductor switching means the current through said first winding will cause said core to pass from one of said states of saturation to the other of said states of saturation, and will also cause a regenerative induced voltage in said second winding to keep said first semiconductor switching means on until said other state of saturation is reached, at which other state of saturation the impedance of said first winding is substantially reduced, thus removing said regenerative voltage on said second winding and turning off said first semiconductor switching means; second semiconductor switching means having input, output and control electrodes; impedance means having one end connected to said first polarity of said source of enregy; said third winding connected intermediate one of said input and output electrodes of said second semiconductor switching means and the other end of said impedance means; the other of said input and output electrodes of said second semiconductor switching means connected to said second polarity of said source of energy; energy storage means connected intermediate said other end of said impedance means and said second polarity of said source of energy; said fourth winding connected intermediate said control electrode of said second semiconductor switching means and said second polarity of said source of energy, and inductively coupled to said first winding such that when said core reaches said other state of saturation, the collapsing magnetic field of said first winding will induce a voltage in said fourth winding of a polarity to turn on said second semiconductor switching means, thus allowing said energy storage means to discharge through said third winding causing said core to be driven back to said one state of saturation, at which one state of saturation said energy storage means will be discharged sufficiently to turn off said second semiconductor switching means; and output means including said fifth winding for providing an output signal each time said core is driven between said two states of saturation.

5. A blocking oscillator comprising: a magnetic core of high flux retentivity having two states of flux saturation at opposite polarities; a plurality of windings on said core including first, second, third, fourth, fifth and sixth windings; a source of energy; first semiconductor switching means having input, output and control electrodes; said first winding connected intermediate said output electrode and a first polarity of said source of energy; said second winding connected intermediate said input electrode and a second polarity of said source of energy; said third winding connected intermediate said control electrode and said second polarity of said source of energy; input means connected to said control electrode; said third winding regeneratively coupled to said first winding by said core, such that when said first semiconductor switching means is turned on by a pulse from said input means the resulting current flow through said first winding will induce a voltage on said third winding of a polarity to hold on said first semiconductor switching means; said third winding capable of sensing flux saturation of said core and capable of turning off said first semiconductor switching means when said core reaches flux saturation; second semiconductor switching means having input, output and control electrodes; said fourth winding connected intermediate said second output electrode and said first polarity of said source of energy; said second input electrode connected to said second polarity of said source of energy; said fifth winding connected intermediate said second control electrode and said second polarity of said source of energy; said fifth winding regeneratively coupled to said fourth winding so as to keep said second semiconductor switching means turned on when there is a current flow through said fourth winding; said fifth winding capable of sensing flux saturation of said core and capable of turning off said second semiconductor switching means when said core reaches flux saturation; and output means including said sixth winding for providing an output pulse each time said core is driven between said two states of saturation.

6. A blocking oscillator comprising: a magnetic core of high flux retentivity having two states of flux saturation at opposite polarities; a plurality of windings on said core including first, second, third, fourth and fifth windings; a source of energy; first semiconductor switching means having input, output and control electrodes; said first winding connected intermediate said output electrode and a first polarity of said source of energy; said input electrode connected to a second polarity of said source of energy; said second winding connected intermediate said control electrode and said second polarity of said source of energy; input means connected to said control electrode; said second winding regeneratively coupled to said first winding, such that when a pulse from said input means turns on said first semiconductor switching means the resulting current flow through said first winding will induce a voltage on said second winding of a polarity to hold on said first semiconductor switching means; said second winding capable of sensing flux saturation of said core and capable of turning off said first semiconductor switching means when said core reaches flux saturation; impedance means connected intermediate said first polarity of said source of energy and one end of said third winding; second semiconductor switching means including input, output and control electrodes; the other end of said third winding connected to said second input electrode; said second output electrode connected to said second polarity of said source of energy; energy storage means connected intermediate said one end of said third winding and said second polarity of said source of energy; said fourth winding connected intermediate said second control electrode and said second polarity of said source of energy; said fourth winding capable of sensing the saturation of said core and capable of turning on said second semiconductor switching means when said core reaches flux saturation; said source of energy capable of discharging through said third winding when said second semiconductor switching means is turned on; said second semiconductor switching means capable of turning off when said energy storage means is discharged to a predetermined point; and output means including said fifth winding for providing an output signal each time said core is driven between said two states of saturation.

7. In combination: a magnetic core of high flux retentivity having two states of flux saturation at opposite polarities; a plurality of windings on said core including first, second, third, fourth, fifth and sixth windings; a source of energy; a first transistor having emitter, collector and base electrodes; first impedance means; one end of said first impedance means connected to a first polarity of said source of energy; said first winding connected intermediate the other end of said first impedance means and said collector electrode; said second winding connected intermediate said emitter electrode and a second polarity of said source of energy; input means connected to said base electrode; said third winding connected intermediate said base electrode and said second polarity of said source of energy; a second transistor having emitter, collector and base electrodes; second impedance means; one end of said second impedance means connected to said first polarity of said source of energy; said fourth winding connected intermediate the other end of said second impedance means and said second collector electrode; said second emitter electrode connected to said second polarity of said source of energy; third impedance means; one end of said third impedance means connected to said second base electrode; said fifth winding connected intermediate the other end of said third impedance means and said second polarity of said source of energy; and output means including said sixth winding for providing an output signal.

8. In combination: a magnetic core of high flux retentivity having two states of flux saturation at opposite polarities; a plurality of windings on said core including first, second, third, fourth and fifth windings; a source of energy; a transistor having emitter, collector and base electrodes; first impedance means; one end of said first impedance means connected to a first polarity of said source of energy; said first winding connected intermediate the other end of said first impedance means and said collector electrode; said emitter electrode connected to a second polarity of said source of energy; input means connected to said base electrode; said second winding connected intermediate said base electrode and said second polarity of said source of energy; a controlled rectifier having an anode, a cathode and a gate electrode; second impedance means; one end of said second impedance means connected to said first polarity of said source of energy; said third winding connected intermediate the other end of said second impedance means and said anode electrode; said cathode electrode connected to said second polarity of said source of energy; said fourth winding connected intermediate said gate electrode and said second polarity of said source of energy; energy storage means connected intermediate said other end fo said second impedance means and said second polarity of said source of energy; and output means including said fifth winding for providing an output signal.

9. A low power blocking oscillator circuit comprising: a magnetic core of high flux retentivity having two states of flux saturation at opposite polarities; first, second, third, fourth, fifth and sixth windings on said core; a source of energy; a first transistor having emitter, collector, and base electrodes; a first resistor having one end connected to a first polarity of said source of energy; said first winding connected intermediate the other end of said first resistor and said collector electrode; said second winding connected intermediate said emitter electrode and a second polarity of said source of energy; first and second input terminals; a capacitor connected intermediate said first input terminal and said base electrode; a second resistor having one end connected to said base electrode; said third winding connected intermediate the other end of said second resistor and said second polarity of said source of energy; said second input terminal connected to said second polarity of said source of energy; a second transistor having emitter, collector, and base electrodes; a third resistor having one end connected to said first polarity of said source of energy; said fourth winding connected intermediate the other end of said third resistor and said second collector electrode; said second emitter electrode connected to said second polarity of said source of energy; a fourth resistor having one end connected to said second base electrode; said fifth winding connected intermediate the other end of said fourth resistor and said second polarity of said source of energy; a pair of output terminals; and said sixth winding connected across said output terminals.

10. A low power blocking oscillator circuit comprising: a magnetic core of high flux retentivity having two states of flux saturation at opposite polarities; first, second, third, fourth and fifth windings on said core; a source of energy; a transistor having emitter, collector and base electrodes; a first resistor having one end connected to a first polarity of said source of energy; said first winding connected intermediate the other end of said first resistor and said collector electrode; said emitter electrode connected to a second polarity of said source of energy; first and second input terminals; a capacitor connected intermediate said first input terminal and said base electrode; a second resistor having one end connected to said base electrode; said second winding conencted intermediate the other end of said resistor and said second polarity of said source of energy; a controlled rectifier having an anode, a cathode and agate electrode; a third resistor having one end connected to said first polarity of said source of energy; said third winding connected intermediate the other end of said third resistor and said anode electrode; said cathode electrode connected to said second polarity of said source of energy; a fourth resistor having one end connected to said second polarity of said source of energy; said fourth winding connected intermediate the other end of said fourth resistor and said gate electrode; a capacitor connected intermediate said other end of said third resistor and said second polarity of said source of energy; a pair of output terminals; and said fifth winding connected across said pair of output terminals.

References Cited by the Examiner

UNITED STATES PATENTS

| | | | |
|---|---|---|---|
| 3,038,128 | 6/1962 | Fischman et al. ---- | 307—88.5-2 |
| 3,159,752 | 12/1964 | Dowburg et al. -- | 307—88.5-27 |

DAVID J. GALVIN, *Primary Examiner.*